United States Patent [19]
Iorizzo et al.

[11] 3,764,935
[45] Oct. 9, 1973

[54] LASER PUMP ENCLOSURE

[76] Inventors: Robert P. Iorizzo, 901 Nottingham Rd., Baltimore; Vernon L. Williams, Bonnie Branch Rd., R.F.D. No. 1, Ellicott City, both of Md.

[22] Filed: July 16, 1971

[21] Appl. No.: 163,484

Related U.S. Application Data
[63] Continuation of Ser. No. 759,411, Sept. 12, 1968, abandoned.

[52] U.S. Cl. ................................ 331/94.5, 330/4.3
[51] Int. Cl. ......................... H01s 3/09, H01s 3/02
[58] Field of Search .................... 331/94.5; 330/4.3

[56] References Cited
UNITED STATES PATENTS

| | | | |
|---|---|---|---|
| 3,356,966 | 12/1967 | Miller | 331/94.5 |
| 3,293,564 | 12/1966 | Fan | 331/94.5 |
| 3,440,558 | 4/1969 | Cameron | 331/94.5 |
| 3,471,801 | 10/1969 | Woodbury et al. | 331/94.5 |

*Primary Examiner*—Ronald L. Wibert
*Assistant Examiner*—R. J. Webster
*Attorney*—F. H. Henson

[57] ABSTRACT

A laser pump enclosure, divided into two substantially equal halves separated by a window with one-half containing the excitation source or pump while the other half contains the laser material. The window separating the two halves of the enclosure provides a suitable seal so that the half containing the laser material is cooled by a circulating liquid while the other half containing the pump is cooled by heat conduction via a heat sink of solid material placed in direct contact with the pump over a predetermined portion of its surface. The heat absorbed by the heat sink is subsequently transferred to the bulk mass of the respective half of the enclosure which in turn includes supplementary circulatory coolant apparatus. The window may additionally allow for still further cooling of the pump by a liquid coolant circulated around the remainder of the pump surface. Also the window, when desirable, may be comprised of a spectral filter element.

5 Claims, 3 Drawing Figures

LASER PUMP ENCLOSURE

This application is a continuation of Ser. No. 159,411, filed Sept. 12, 1968.

CROSS-REFERENCE TO RELATED APPLICATION

The present invention is related to a co-pending application entitled "Laser Having Increased Energy Output", U. S. Ser. No. 759,412 filed on Sept. 12, 1968, now abandoned, the inventors being John L. Wentz and Robert P. Iorizzo and assigned to the assignee of the present invention.

BACKGROUND OF THE INVENTION

This invention relates to a laser system and more particularly to means for minimizing the heating of such a laser system when in operation. Such a system includes a lasing element, for example a crystal rod which when stimulated by light from an excitation source or pump emits coherent, monochromatic light of a specific wavelength called its characteristic emission frequency.

It also includes an enclosure often referred to as a cavity. Cavities take many different form factors; however, the most widely used cavity configuration is one having either a circular or an elliptical cross-section. The inner surface of the cavity is highly reflective and the pump and the laser rod are selectively located within the cavity so that maximum energy transfer can be provided from the pump to the laser material.

One of the inherent problems faced in the operation of solid state lasers is the heat problem encountered from the pump itself which is frequently comprised of linear xenon flash tubes. The normal procedure for pumping a solid state laser is to excite a linear xenon flash tube, sometimes referrd to as a flash lamp, within a polished enclosure containing a laser rod. Because the transmitted laser radiation amounts to only a few percent or less of the input electrical energy, the remaining energy must be removed as heat. Prior art apparatus removes head from the apparatus by the use of liquid or air cooling. Both of these concepts require bulky structure inside the laser enclosure which further decreases the already poor energy conversion efficiency. Furthermore, these structures require the air or liquid to be contained within a cylinder concentric to the flash tube.

Apparatus specifically directed to cooling apparatus for laser systems is well known to those skilled in the art. For example, U.S. Pat. No. 3,356,966, issued to W. S. Miller, entitled "Laser Cooler Apparatus" discloses such apparatus. Said patent discloses a pump cavity of both circular and elliptical configurations wherein suitable liquid coolant means is adapted to circulate about both the laser element and the excitation source. Moreover, one embodiment of this invention discloses a cavity having a separation located between the two halves of the cavity such that the excitation source and the lasering element may be separately cooled.

SUMMARY OF THE INVENTION

The present invention is directed to improved cooling apparatus for laser systems wherein the bulky cooling structure is moved to the outside of the laser cavity where the heat exchange problem is less critical. The invention is directed to a laser pumping enclosure including a cavity of circular cross section comprising two substantially equal halves having highly reflective inner surfaces separated by a window of selected spectral characteristics for sealing the two halves from one another so that liquid coolant may be introduced into a selected half or halves of the enclosure without leakage into the other half; one-half of the enclosure includes a laser pump, for example, a flash tube mounted therein while the other half includes a laser element, for example a laser rod mounted therein; a solid head sink conforming to the outer surface of the laser pump is placed in direct contact with a predetermined portion of the surface of the pump for absorbing the heat of energization therefrom; and also heat exchanger means is located adjacent said solid heat sink for dissipating heat coupled to said heat sink from said laser pump.

DESCRIPTION OF THE PREFERRED EMBODIMENT

Figure 1:
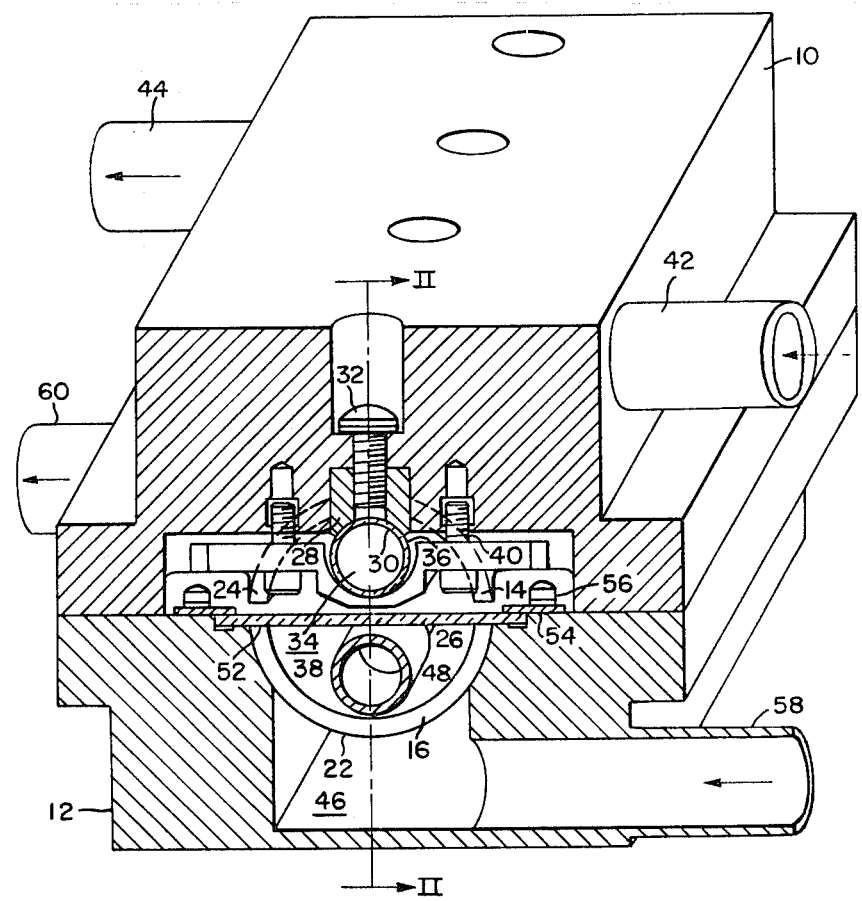
FIG. 1 is a perspective view of the preferred embodiment of the subject invention.

Referring now to the drawings 1, 2 and 3 collectively, the invention, inter alia, is comprised of two halves 10 and 12 of a laser enclosure each having an insert 14 and 16, respectively, of circuar cross-section. Both inserts form a laser cavity and moreover, are highly effecient silver surfaced mirrors the substrate of which is pyrex tubing. A layer of silver 18 is applied to the outer surface of the cavity inserts 14 and 16 and is then protected with a thin layer of nickel 20. The resulting combination of the insert and layers of silver and nickel provides a second surface reflector which is highly reflective, durable, easily cleaned, readily replaced and capable of withstanding extreme temperatures. The reflector including insert 16 is semi-cylindrical while the reflector comprising the insert 14 is split into two quarter sections 24 and 26 which straddle a metallic heat sink 28 comprised of metal heat conductor. The metallic heat sink is of a selected mass and includes a concave surface 30. The heat sink is mounted in the upper half of the enclosure 10 by means of the bolts 32 such that substantially all of its surface exclusive of the concave surface 30 is surrounded by the mass of the enclosure half 10. An excitation source comprising a flash tube 34 is mounted in the upper half of the enclosure 10 such that the concave surface 30 of the heat sink 28 is in direct contact with a portion of the outer surface 36 of the flash tube over a substantial portion of its length. The flash tube 34 is held in position against the heat sink 28 by means of the clamp 38 and the bolts 40.

It should be observed that the concave surface 30 of the heat sink 28 matches the curvature of the outer surface 36 of the flash tube 34. The heat removed from the flash tube therefore must pass through this interface. Therefore, it is necessary that either good physical contact be maintained or some bonding agent be used to ensure that the interface provides a low resistance to heat flow. This is provided by the clamp 38. Assuming the interface offers a low resistance to heat flow, the number of joules/sec. or watts of heat removed is given by the equation $$P = [k A (\theta_1 - \theta_2)]/d \text{ watts} \quad (1)$$

where
- $k$ is the coefficient of thermal conductivity in joules/sec. cm. °C.
- $A$ is the interface area in cm$^2$
- $\theta_1$ is the temperature of flash tube surface in °C
- $\theta_2$ is the temperature at the cooled end of the copper bar in °C
- $d$ is the thickness of the copper in cm Taking the following typical values
- $k = 3.8$ joules/cm. sec °C
- $A = 8$ cm$^2$
- $d = 3$ cm
- $P = [3.8 (8) (\theta_1 - \theta_2)]/3$ watts
- $P \approx 10 (\theta_1 - \theta_2)$ watts.

For a reasonable temperature difference $(\theta_1 - \theta_2)$ of 200°C, 2,000 watts of heat can be removed by the heat sink 28. The bulkmass of the half of the enclosure 10 provides a heat exchanger for the heat sink 28. Additionally a circulating coolant system having an inlet 42 and an outlet 44 is adapted to circulate a liquid coolant when desirable within the upper half of the enclosure 10 for enhancing the heat dissipation.

A laser rod 46 is located within the lower half of the enclosure 12 adjacent the inner surface of the reflector 22, being held in position by means of cylindrical holders 48 located at opposite ends of the laser rod. The holders 48 are maintained stationary by means of the set screws 50. The laser rod 46 and the flash tube 34 occupy a substantial amount of the area between the axis and the inner surface of cylindrical cavity described by the semi-cylindrical reflector and the two quarter sections 24 and 26. This embodiment results in a closely coupled configuration. With this type of enclosure the heat conducting bar or heat sink 28 can be made shorter than would be the case in a normal elliptical cavity wherein the flash tube and laser rod are mounted at the foci. Additionally, the use of a shorter bar and the attendant ability to remove more heat results in better lasing efficiency due to the fact that the heat sink does not intercept the flash tube pumping light to the extent that would occur with a normal elliptical enclosure.

Between the flash tube 34 and the laser rod 46 is located a window 52 designed to seal the lower half of the enclsoure 12 from the upper half 10. A coolant is introduced into the region surrounding the laser rod 46 but is prevented from entering the area surrounding the flash tube 34 by means of the window 52. The window 52 is held in position by means of the clamp 54 and the bolts 56. The lower half of the enclosure 12 further includes a coolant inlet 58 which is adapted to feed a suitable liquid coolant into the region surrounding the laser rod 46. An exit for the coolant is provided by the outlet 60 at the opposite end of the lower half of the enclosure 12.

Although the window 52 may be completely transparent it is desirable in certain laser systems that specific filtering of light from the pump be accomplished for optimum operation or emission from the laser material. Specifically, in accordance with the aforementioned copending related application where the laser rod comprises a neodymium laser host the ultraviolet light radiated from the flash tube is filtered and is prevented from striking the laser element. Accordingly, the window 52 has a spectral characteristic with a cut-off wavelength in the region of 4,000 A. units while providing complete transmission of light energy in the region of 5,000 A. units, particularly where the laser element is comprised of neodymium doped yttrium aluminum garnet (Nd:YAG). Alternatively, a transparent window 52 may be used, however, the coolant introduced at the inlet 58 would be comprised of a liquid having the spectral characteristics described above for filtering the ultraviolet light radiated from the excitation source.

Figure 2:
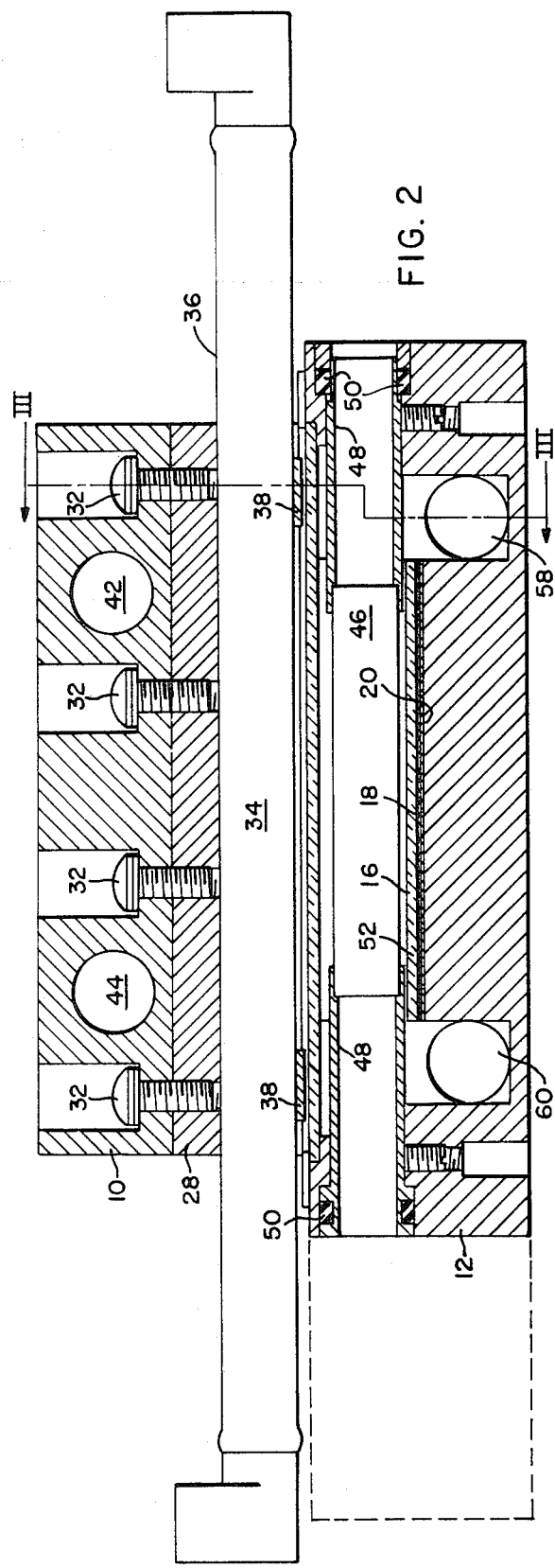
FIG. 2 is a central cross-sectional view of the preferred embodiment shown in FIG. 1 taken along the lines 2—2.
Figure 3:
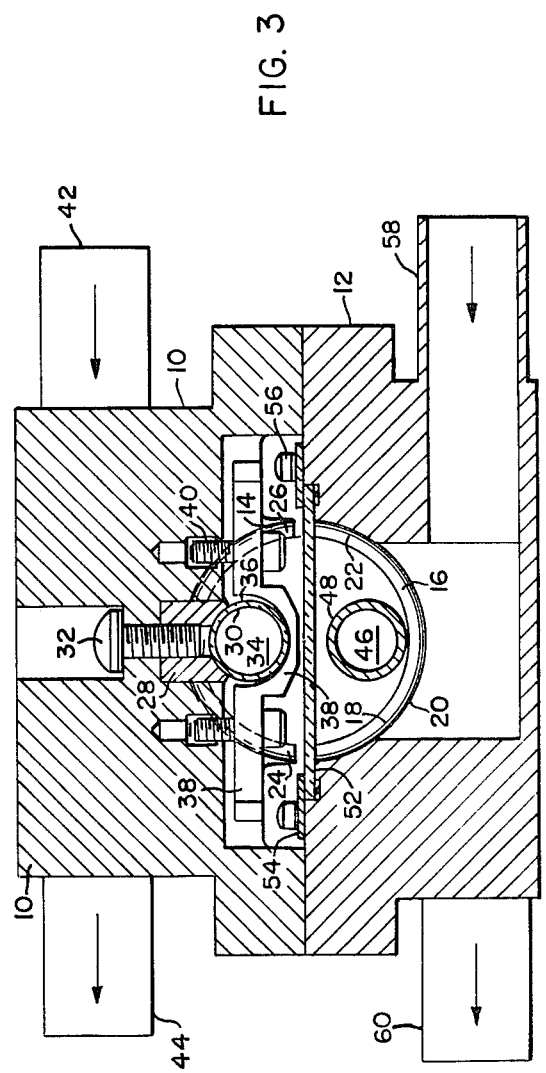
FIG. 3 is a sectional view of the embodiment shown in FIGS. 1 and 2 taken along the lines 3-3 of FIG. 2.

The laser enclosure described with respect to FIGS. 1 through 3 permits separate cooling of the flash tube 34 and the laser rod 46. It should also be pointed out that, when desirable, the enclosure can be operated without any liquid coolant at all provided the repetition frequency and duty cycle permit. Without any liquid coolant, the system performance would be restricted by the ability of the laser material to withstand the elevated temperature produced by operation of the flash lamp, 54. When system requirements are such that higher repetition rates and duty cycles are required, the enclosure is capable of providing three separate cooling modes.

In the first and most frequently used mode the laser rod is actively cooled by means of an appropriate liquid coolant which is directed through the lower half of the enclosure 12 being introduced at the inlet 58 flowing around the laser rod 46 and being fed out the inlet 60. The small volume contained by the lower half of the cavity 12 is very conducive to the attainment of both a good film coefficient and high flow rate. The flash tube 34, however, is not cooled by a liquid. It is allowed to transfer its heat, via conduction, to the heat sink 28 which is accurately contoured to match the curvature of the flash tube 34 and thus ensures through direct contact, a low impedance path to the bulk mass of the upper enclsoure 10. While employing this cooling mode with a 50 cc water supply flowing at approximately 0.25 gallons/min. it is possible to operate the laser with 25 joules into the flash tube, at 10 pps, for a period of 100 seconds continuously without any degradation in outward energy. Flash tube life under these conditions is in excess of 100,000 flashes.

The second cooling mode is designed to accommodate a higher flash tube heat load, which may be the result of a longer "on time" for the laser. This second mode requires an increased volume of coolant and provides for the additional cooling of the mass of the upper half of the enclosure 10 for heat dissipation. This does not mean that the coolant comes into contact with the flash tube 34. The flash tube 34 on the other hand still transfers its heat to the enclosure structure 10 by conduction of heat through the solid material heat sink 28. However, the heat is then removed from the structure by means of a supplementary system in the enclsoure itself wherein the circulating coolant is introduced at inlet 42 and removed at the outlet 44.

The first two modes of operation described have the attendant advantage in that it enables the replacement of the flash tube 34 without the need of having to drain any coolant. The flash tube 34 can also be replaced quickly and without disturbing the optical alignment of the laser rod 46.

The third mode of operation is resorted to when the input energy, repetition rate, or duty cycle become excessive for operation in the second cooling mode and the entire cavity both upper and lower halves of the enclosures 10 and 12 are sealed and the areas surrounding both the laser rod 46 and the flash tube 34 are directly cooled by means of a liquid coolant in addition to the heat conduction provided by the heat sink 28.

What has been shown and described therefore is an improved laser pumping enclosure which is capable of operating under almost any condition due to its rugged lightweight construction while its closely coupled geometry and high quality reflectors make it extremely efficient. The versatile cooling arrangement renders the subject invention applicable to an extremely wide range of laser requirements while the provision for spectral filtering of the pump source makes it compatible with selective laser materials.

While there has been shown and described what is at present considered to be the preferred embodiment of the invention, modifications thereto readily occur to those skilled in the art. It is not desired therefore that the invention be limited to the specific arrangement shown and described but it is to be understood that all equivalents, alterations and modifications within the spirit and scope of the present invention are herein meant to be included.

What is claimed is:

1. A laser system comprising a cylindrical enclosure divided into two separable cylindrical concave sections having an internal surface highly reflective to light energy, a linear active laser element located wholly within the concave cavity of the first of said cylindrical sections responsive to radiation of some predetermined frequency to cause lasing, means including a light filter window spanning the open side of said first section and sealed thereto to provide a closed chamber enveloping said laser element, a liquid coolant in contact with said laser element and substantially filling the space surrounding said laser element within said closed chamber in which said laser element is located, a linear source of excitation light energy including said predetermined frequency mounted in the second of said cylindrical sections support means separate from the last mentioned means for positioning said second cylindrical section and said linear light source in fixed relation to said closed chamber for enclosing removal of said second cylindrical section and said linear light source without disturbing the seal integrity of said closed chamber said light filter serving to pass to said coolant and said laser medium substantially only said radiation at said predetermined frequency, and a metal heat sink including heat exchanger means mounted on the second of said sections in direct heat transfer contact with said light source for removing heat therefrom.

2. The invention as defined by claim 1, wherein said light source comprises a flash lamp and said active laser element comprises a laser rod.

3. The invention as defined by claim 1, wherein said light source comprises a flash lamp and wherein said heat sink comprises a bar of metallic heat conductive material having one surface contoured to match the external surface of said flash lamp and having a predetermined length for being in intimate contact with said flash lamp over a substantial portion of its length.

4. The invention as defined by claim 1, wherein said heat sink comprises a metal bar being in direct contact with said light source for a substantial portion of its length and wherein said heat exchanger means comprises a metallic bulk mass having a coolant system therein adapted to carry coolant through said bulk mass.

5. The invention as defined by claim 1, wherein said light source comprises a flash lamp and said active laser element comprises a laser rod, and additionally including means for locating said flash lamp and said active laser source in a closely coupled configuration within said cavity, and wherein said heat sink comprises a metallic member having one surface contoured to the shape of said flash lamp.

* * * * *